Nov. 27, 1928.  
H. S. HUMPHREY  
POWER LAWN MOWER  
Filed Dec. 16, 1924
1,692,838
2 Sheets-Sheet 1
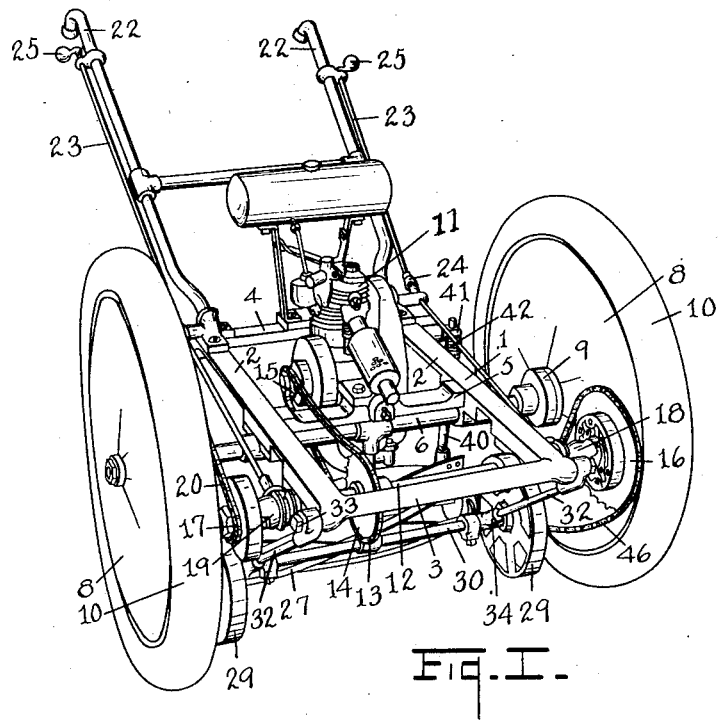
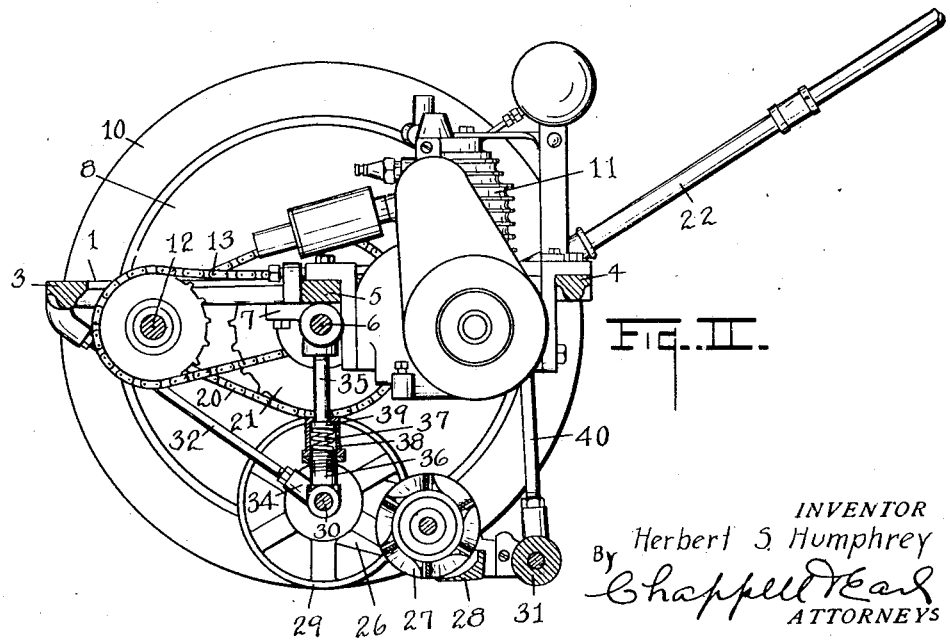
INVENTOR  
Herbert S. Humphrey  
By Chappell Earl  
ATTORNEYS Nov. 27, 1928.
H. S. HUMPHREY
POWER LAWN MOWER
Filed Dec. 16, 1924
1,692,838
2 Sheets-Sheet 2
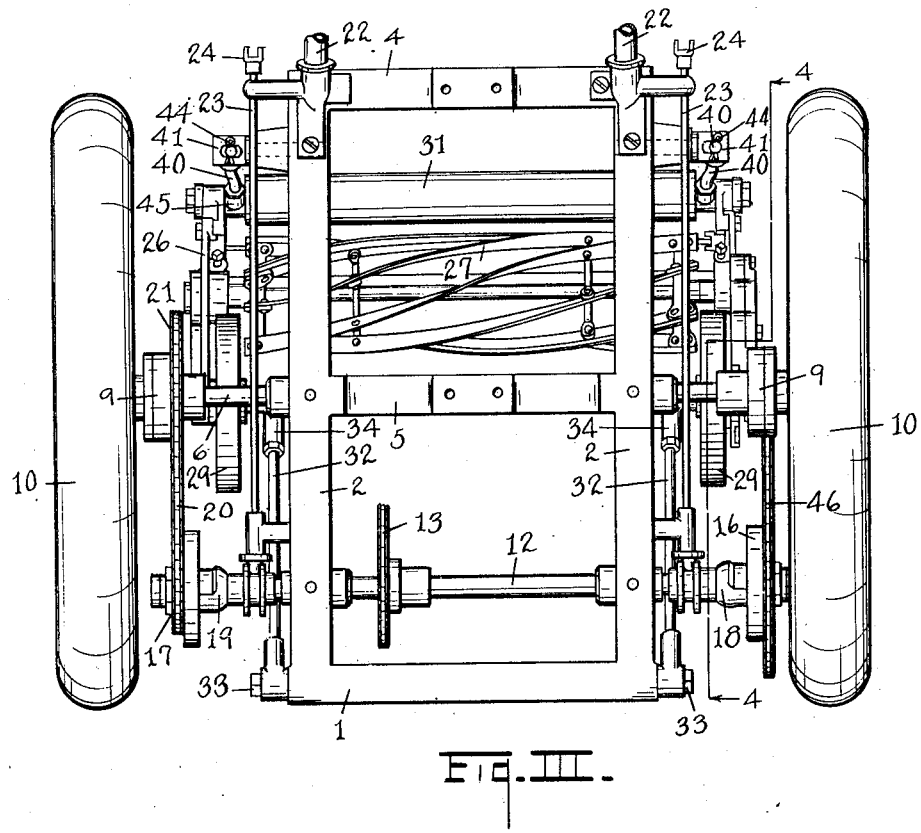
Fig. III.
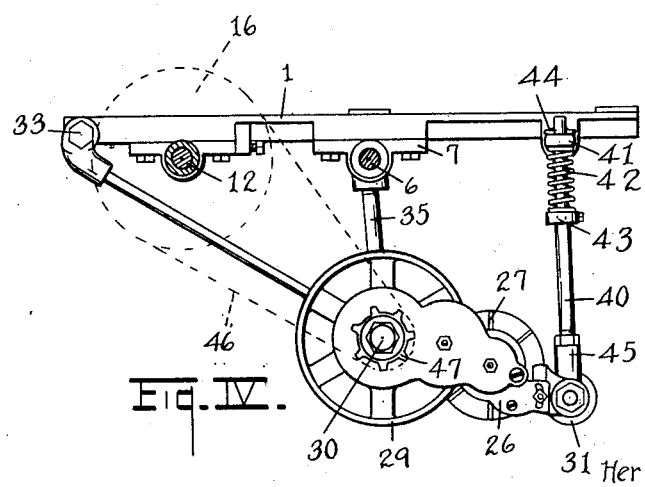
Fig. IV.
INVENTOR
Herbert S. Humphrey
BY
Chappell Earl
ATTORNEYS Patented Nov. 27, 1928.

1,692,838

UNITED STATES PATENT OFFICE.

HERBERT S. HUMPHREY, OF KALAMAZOO, MICHIGAN.

POWER LAWN MOWER.

Application filed December 16, 1924. Serial No. 756,229

This invention relates to improvements in power lawn mowers.

The main objects of this invention are:

First, to provide an improved power lawn mower which is well adapted for the mowing of putting greens, lawns and the like.

Second, to provide an improved power mower which cuts the grass uniformly and closely without leaving tracks or marks.

Third, to provide an improved power mower which is well adapted for uneven surfaces, such as putting greens having rolls or ridges.

Fourth, to provide an improved mower having these advantages which requires but little manual effort to operate the same.

Objects pertaining to details and economies of construction and operation of my invention will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a front perspective view of a power mower embodying the features of my invention.

Fig. II is a vertical longitudinal section.

Fig. III is a plan view with the motor omitted and certain parts broken away

Fig IV is a fragmentary section on a line corresponding to line 4—4 of Fig. III.

In the drawing the similar numerals of reference indicate similar parts in all of the views.

Referring to the drawing, I provide a main frame 1 which is preferably a casting comprising longitudinal members 2, a front cross member 3, a rear cross member 4 and a central cross member 5. The carrying axle 6 is secured to the under side of this frame by means of the bearings 7.

The carrying wheels 8 which are of comparatively large diameter are connected to the axle by means of ratchets shown conventionally at 9. The carrying wheels are provided with pneumatic tires 10.

The engine designated generally by the numeral 11 is mounted on the frame 1 at the rear of the axle 6. Mounted on the frame at the front thereof is a jack shaft 12 which is connected to the motor by the sprocket chain 13 and sprockets 14 on the jack shaft and 15 on the motor shaft. The jack shaft is provided with driving sprockets 16 and 17 which are connected to the jack shaft by the clutches 18 and 19, respectively. These clutches are conventionally shown. The sprocket 17 is connected by the sprocket chain 20 to a driven sprocket 21 on the axle.

The main frame is provided with a pair of handles 22 for guiding the machine. The clutches are controlled by the control rods 23 having universal joints 24 therein and provided with hand pieces 25, the rear ends of these control rods being mounted on the handles for convenience in manipulation.

I provide a cutter unit comprising a frame designated generally by the numeral 26, the rotary cutter 27 and coacting cutter bar 28 being mounted on this frame. The cutter unit carrying wheels 29 are mounted on the axle 30. These carrying wheels 29 are idler wheels, that is, they are not driven. At the rear of the cutter is a gauge roller 31.

The cutter unit is floatingly mounted below the main frame by means of the draft bars 32 which are pivoted at the front end of the main frame at 33 and pivotally connected to the axle 30 by the couplings 34. These draft bars are of such length that the axle of the cutter unit wheels is in approximately the vertical plane of the axle 6. The axle 30 is connected to the axle 6 by means of a link formed of telescoping sections 35 and 36 as shown in Fig. II. This link is adapted to limit the downward movement of the axle 30 relative to the axle 6 while permitting its upward movement, this upward movement, however, being resisted by the spring 37 arranged between the link sections.

The link section 36 has a coupling part 38 threaded thereon to engage the head 39 of the link section 35 thereby providing for adjustment.

The cutter unit is further supported by the rear links 40 which are connected to the rear corners of the cutter unit and slidably engage the brackets 41 on the main frame. Springs 42 are arranged between these brackets and thrust collars 43 on the links, thus urging the cutter frame yieldingly downward while permitting its upward movement. The pins 44 disposed through the links above the brackets limit the downward movement of the links.

These links are threaded for adjustment into the members 45 by which they are coupled to the cutter unit frame.

The driving sprocket 16 is connected by the sprocket chain 46 to the driven sprocket 47 of the cutter unit. The details of the cutter driving gear are not illustrated as they form no part of this invention.

It will be noted that the diameter of the main carrying wheels is much greater than that of the cutter unit wheels. The main wheels being provided with penumatic tires, the lawn or green is not injured and the wheels do not drop into small holes or depressions in the ground. The only function of the wheels 29 being to carry the cutter, the turf is not abraded or broken thereby as is likely to be the case where these wheels are utilized as propelling or as cutter driving wheels.

The cutter unit is floatingly supported so that while it is effectively held to the work the cutter may be accurately gauged and the likelihood of the turf being marked or broken is minimized.

I have illustrated my improvements in an embodiment which I have found very practical. I have not attempted to illustrate or describe certain adaptations or modifications as I believe the disclosure made will enable those skilled in the art to embody or adapt my improvements as may be desired.

Having thus described my invention what I claim as new and desire to secure by Letters Patent is:

1. The combination of a main frame, an axle disposed centrally of said main frame, carrying and driving wheels having ratchet connections to said axle, a driven sprocket on said axle, a motor mounted on said main frame at the rear of said axle, a jack shaft mounted on said main frame at the front of said axle, driving connections from said motor to said jack shaft, a cutter unit comprising a cutter, a frame disposed below said main frame, and carrying wheels for said cutter unit, said main frame wheels being of substantially greater diameter than said cutter unit wheels, a driven sprocket on said cutter unit, the axis of the cutter unit wheels being in approximately the vertical plane of the said main frame axle, draft bars mounted at the front end of said main frame and pivotally connected to said cutter unit, links connecting said cutter unit frame to said main frame whereby said cutter unit is floatingly supported, a pair of driving sprockets mounted on said jack shaft and having clutch connections thereto, and sprocket chains connecting said driving sprockets with said driven sprockets.

2. The combination of a main frame, an axle disposed centrally of said main frame, carrying and driving wheels having ratchet connections to said axle, a driven sprocket on said axle, a motor mounted on said main frame at the rear of said axle, a jack shaft mounted on said main frame at the front of said axle, driving connections from said motor to said jacket shaft, a cutter unit comprising a cutter provided with a driven sprocket, a frame, draft connections from said cutter frame to said main frame permitting rising and falling movement of the said cutter unit independently of said main frame and carrying wheels for said cutter unit, said main frame wheels being of substantially greater diameter than said cutter unit wheels, the axis of the cutter unit wheels being in approximately the vertical plane of the said main frame axle, a pair of driving sprockets mounted on said jack shaft and having clutch connections thereto, and sprocket chains connecting said driving sprockets with said driven sprockets on said axle and cutter unit.

3. The combination of a main frame, an axle, carrying and driving wheels having ratchet connections to said axle, a driven sprocket on said axle, a motor mounted on said main frame, a jack shaft mounted on said main frame, driving connections from said motor to said jack shaft, a cutter unit provided with a cutter disposed below said main frame and having a driven sprocket, carrying wheels for said cutter unit, said main frame wheels being of substantially greater diameter than said cutter unit wheels, the axis of the cutter unit wheels being in approximately the vertical plane of the said main frame axle, draft bars for said cutter unit, links connecting said cutter unit to said main frame whereby the cutter unit is floatingly supported, a pair of driving sprockets mounted on said jack shaft and having clutch connections thereto, and sprocket chains connecting said driving sprockets to said driven sprockets on said axle and cutter unit.

4. The combination of a main frame, an axle, carrying and driving wheels having ratchet connections to said axle, a driven sprocket on said axle, a motor mounted on said main frame, a jack shaft mounted on said main frame, driving connections from said motor to said jack shaft, a cutter unit provided with a cutter mounted below said main frame and having a driven sprocket, carrying wheels for said cutter unit, said main frame wheels being of substantially greater diameter than said cutter unit wheels, the axis of the cutter unit wheels being in approximately the vertical plane of the said main frame axle, a pair of driving sprockets mounted on said jack shaft and having clutch connections thereto, and sprocket chains connecting said driving sprockets to said driven sprockets on said axle and cutter unit.

5. The combination of a main frame, an axle, carrying and driving wheels having ratchet connections to said axle, a driven sprocket on said axle, a motor mounted on said main frame at the rear of said axle, a jack shaft mounted on said main frame at the front of said axle, driving connections from said motor to said jack shaft, a sub-frame disposed below said main frame, a cutter unit on said sub-frame provided with a driven sprocket, driving connections from said motor to said cutter unit, carrying wheels for said sub-frame, draft bars pivotally mounted at the front end of said main frame and pivotally connected to said sub-frame, links connecting said sub-frame to said main frame for limiting its downward movement while permitting its upward movement, springs arranged to urge said sub-frame yieldingly downward, driving sprockets mounted on said jack shaft and having clutch connections thereto, and sprocket chains connecting said driving sprockets with said driven sprockets on said axle and cutter unit.

6. The combination of a main frame provided with a steering handle, an axle for said main frame, carrying and driving wheels having ratchet connections to said axle, a motor mounted on said main frame, a jack shaft mounted on said main frame, driving connections from said motor to said jack shaft, a sub-frame disposed below said main frame, a cutter on said sub-frame, carrying wheels for said sub-frame, draft bars pivotally mounted at the front end of said main frame and pivotally connected to said sub-frame, links connecting said sub-frame to said main frame for limiting its downward movement while permitting its upward movement, a spring arranged to urge said sub-frame yieldingly downward, and independent driving connections from said jack shaft to said axle and cutter.

7. The combination of a main frame, an axle, carrying and driving wheels on said axle, a motor mounted on said main frame having driving connection to said wheels, a cutter unit comprising a frame disposed below said main frame, an axle disposed below said main frame axle, carrying wheels on said cutter unit axle, said main frame wheels being of substantially greater diameter than said cutter unit wheels, a cutter disposed at the rear of said cutter unit axle, a gauge roller disposed at the rear of said cutter, draft bars pivotally mounted at the front end of said carrying frame and pivotally connected to said cutter unit axle, a front link connecting said axles disposed centrally thereof and comprising adjustably connected telescoping sections having a thrust spring interposed between the same, a pair of links connected to the rear corners of the cutter unit frame and slidably engaged with the main frame whereby the downward movement of the cutter unit relative to the main frame is limited, said rear links having thrust springs whereby the cutter unit is floatingly supported, and driving connections from said motor to said cutter.

8. In a power mower, the combination of a main frame, carrying and driving wheels provided with pneumatic tires, a motor mounted on said main frame, driving connections from said motor to said wheels, a cutter unit provided with a cutter and carrying wheels, draft bars extending from the forward end of said main frame to said cutter unit, adjustable links connecting said cutter unit to said main frame to limit the downward movement of the cutter unit relative to the main frame while permitting independent upward movement, springs urging said cutter unit downwardly, and driving connections from said motor to said cutter.

9. In a power mower, the combination of a main frame, carrying and driving wheels provided with pneumatic tires, a motor mounted on said main frame, driving connections from said motor to said wheels, a cutter unit provided with a cutter and carrying wheels, the axis of the carrying wheels being in approximately the vertical plane of the axis of the driven wheels, draft bars extending from the forward end of said main frame to said cutter unit, links connecting said cutter unit to said main frame to limit the downward movement of the cutter unit relative to the main frame while permitting independent upward movement, and driving connections from the motor to said cutter.

10. In a power mower, the combination of a main frame, carrying and driving wheels provided with pneumatic tires, a motor mounted on said main frame, driving connections from said motor to said wheels, a cutter unit provided with a cutter and carrying wheels, the axis of the cutter unit carrying wheels being approximately in a vertical plane with the axis of said main frame wheels, draft bars extending from the forward end of said main frame to said cutter unit, links connecting said cutter unit to said main frame to limit the downward movement of the cutter unit relative to the main frame while permitting independent upward movement, and driving connections from the motor to said cutter.

11. In a power mower, the combination of a main frame, carrying and driving wheels therefor, a motor, driving connections from said motor to said wheels, a sub-frame disposed below said main frame provided with carrying wheels, the diameter of said main frame wheels being substantially greater than that of said sub-frame wheels, a cutter on said sub-frame, driving connections thereto from said motor, draft bars for said sub-frame, means for limiting the downward movement of said sub-frame relative to said main frame while permitting vertical movement thereof, and springs arranged to urge said sub-frame yieldingly downward.

12. In a power mower, the combination of a main frame, carrying and driving wheels therefor provided with pneumatic tires, a motor, driving connections therefor to said wheels, a sub-frame provided with carrying wheels disposed with their axis in substantially the vertical plane of the axis of the driving wheels, the diameter of said main frame wheels being substantially greater than that of said sub-frame wheels, draft connections for said sub-frame to said main frame permitting vertical movement of the sub-frame independently of the main frame, a cutter on said sub-frame, and driving connections thereto from said motor.

13. The combination of a main frame, an axle disposed centrally of said main frame, carrying and driving wheels having ratchet connections to said axle and provided with pneumatic tires, a motor mounted on said main frame and having driving connections to said axle, a cutter unit comprising a frame, draft connections for said cutter unit frame to said main frame permitting rising and falling of the cutter unit independently of the main frame, carrying wheels for said cutter unit, said main frame wheels being of substantially greater diameter than said cutter unit wheels, the axis of the cutter unit wheels being in approximately the vertical plane of the said main frame axle, a cutter disposed at the rear of said cutter unit axle, a gauge roller disposed at the rear of said cutter, and driving connections from said motor to said cutter.

14. The combination of a main frame, carrying and driving wheels, a motor mounted on said main frame and having driving connections to said wheels, a cutter unit, draft bars connecting said cutter unit to said main frame, links connecting said cutter unit to said main frame for limiting its downward movement while permitting its upward movement, springs arranged to urge said cutter unit yieldingly downward, carrying wheels for said cutter unit, said main frame wheels being of substantially greater diameter than said cutter unit wheels, a cutter on said cutter unit, and driving connections from said motor to said cutter.

15. In a power mower, the combination of a main frame, carrying and driving wheels, a motor mounted on said main frame and having driving connection to said wheels, a cutter unit including a cutter and provided with carrying wheels, draft bars connecting said cutter unit to said main frame, links connecting said cutter unit to said main frame for limiting its downward movement while permitting its upward movement, springs arranged to urge said cutter unit yieldingly downward, and driving connections from said motor to said cutter.

In witness whereof I have hereunto set my hand.

HERBERT S. HUMPHREY.